May 28, 1963   R. HASSA   3,091,285
GAS BURNER SAFETY AND REGULATOR CONTROL VALVE SYSTEM
Filed Aug. 23, 1961   2 Sheets-Sheet 1

Richard Hassa,
INVENTOR.

BY
Darby, Robertson & Vandenburgh,
attorneys

United States Patent Office 3,091,285
Patented May 28, 1963

3,091,285
GAS BURNER SAFETY AND REGULATOR CONTROL VALVE SYSTEM
Richard Hassa, Osnabruck, Germany, assignor to G. Kromschroder Aktiengesellschaft, Osnabruck, Germany
Filed Aug. 23, 1961, Ser. No. 135,406
Claims priority, application Austria Aug. 24, 1960
7 Claims. (Cl. 158—131)

This invention relates to gas burners and particularly to a valve mechanism and electrically operated controls associated therewith for closing the main valve upon failure of the pilot flame and for regulating the main burner valve responsive to thermostatic control.

The principal object of the invention is to provide simple and dependable means for safely igniting and operating the gas burner; specific objectives will become apparent as the description proceeds.

Figure 1:
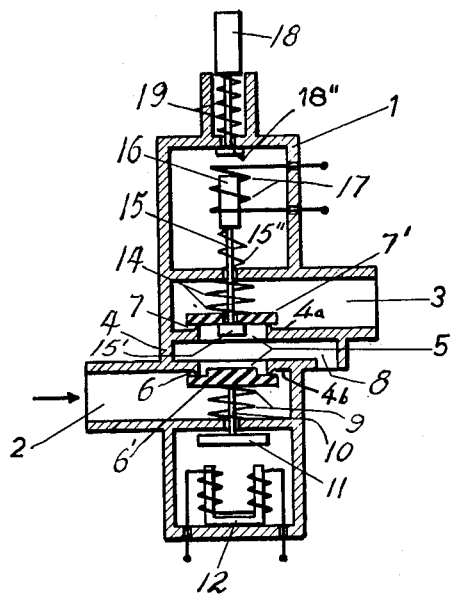
Figure 2:
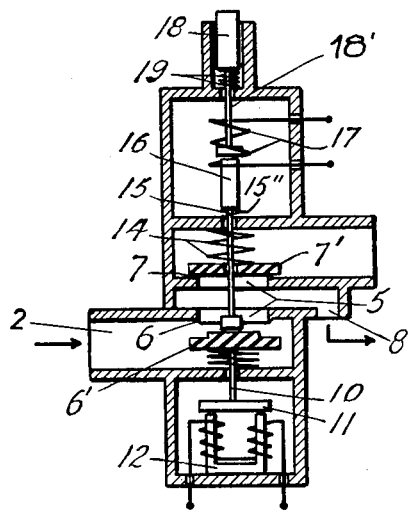
Figure 3:
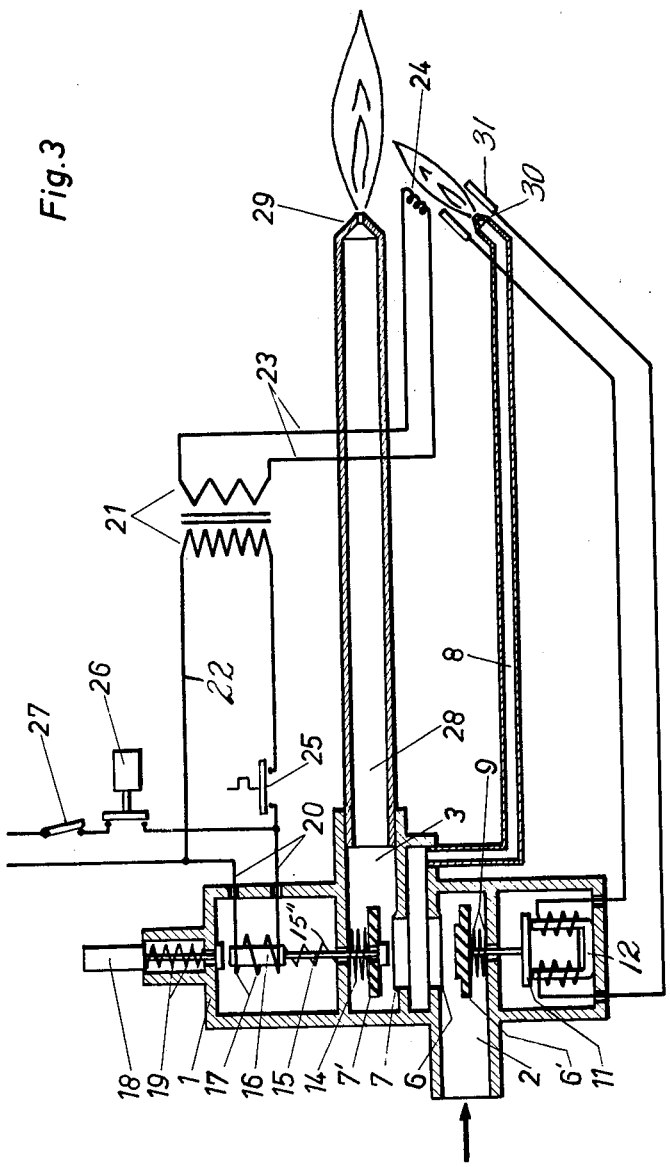

In the accompanying drawings,

FIGS. 1 and 2 are schematic representations of the valve system of the invention, the valve being closed and in non-operational position in the illustration of FIG. 1 and the gas inlet valve being open to the pilot burner in the illustration of FIG. 2, and FIG. 3 is a schematic representation similar to that of FIGS. 1 and 2 showing the position of the valve system in fully operational condition and illustrating also the gas burners and the electrical control apparatus associated with the valve.

Referring to the drawings for a detailed description of the control valve system and its mode of operation, valve case 1 is provided with a gas inlet duct 2 and a main burner gas outlet duct 3. A partition, indicated generally by the numeral 4, comprises a pair of spaced walls 4a and 4b, separates outlet 3 from inlet 2 and defines a pilot burner gas supply conduit 8. Each of the partition walls 4a and 4b has a passageway 5 therein, the passageways being provided with valve seats 6 and 7, respectively, for the control of the flow of gas therethrough. Valve plates 6' and 7' are operatively associated with valve seats 6 and 7, respectively, compression springs 9 and 14 being provided to bias the respective valves toward closed positions.

As will be seen, valve 6, 6' is responsive to the ignition condition of the pilot burner, closing to shut off all gas supply upon extinguishment of the pilot flame, while the valve 7, 7' may be thermostatically controlled to regulate the main burner. The control apparatus associated with the safety control valve 6, 6' is illustrated fully in FIG. 3. The pilot burner 30, connected through conduit 8 to the valve assembly between the two valves is provided with a thermocouple 31 at a location at which this temperature sensing device will be affected by the heat from the pilot flame. This thermocouple is connected with the windings of electromagnet 12 located in the base of valve case 1. An armature 11 is affixed to the end of a valve stem 10 for cooperation with the electromagnet in controlling the position of valve plate 6'. It will be understood that armature 11 is rigidly associated with valve plate 6 by means of the intervening stem 10. The arrangement is such that current from thermocouple 31, when the latter is heated by the pilot flame, energizes the electromagnet to attract and hold armature 11 and thus maintain valve 6, 6' in open position.

A valve stem 15 extends slidably through valve plate 7', being provided with an armature 16 at its top end and a button or stop 15' at its lower end. A spring 15" biases the button 15' against the valve plate 7', but is so designed that it is weaker than the spring 14 which maintains the valve plate 7' in closed position. A shaft 18' extends coaxially with the valves and valve stems through the valve case 1 and is equipped with a push button 18 for manual manipulation at the outer end of the shaft and a button or stop 18" at its inner end. A compression spring 19 is arranged to bias the shaft and push button outwardly to a normally retracted position. At this position, the inner button 18" is spaced clear of the top end of armature 16 at the uppermost position of the latter (as shown in FIG. 3).

A magnet energizer circuit 20 is connected with coil 17. Circuit 20 is connected in parallel with the primary circuit 22 of an ignition transformer 21, these parallel circuits being connected with an external source of current, not shown. The secondary circuit 23 of the transformer is connected in series with an ignition coil 24 associated with the pilot burner 30 for ignition of the gas supplied thereto to provide the pilot flame. A thermal cut-off switch 25 is connected in the primary circuit 22 and a main switch 27 is provided in the main supply line to the external source of current and a thermostat 26 is connected in series with this main switch to control the passage of current through the entire circuit. The thermal cut-off switch is generally located in the stack where it is responsive to heat from the pilot and main burners.

As will be seen in FIG. 3, the main gas burner 29 is connected with the valve gas outlet 3 by means of tube 28.

In the non-operational position shown in FIG. 1, the safety control valve 6, 6', under the load of spring 9, and the regulator valve 7, 7', under the load of spring 14, are closed, while the two magnets 12 and 17 associated with these two valves are not energized when the pilot burner is not ignited and the main switch 27 is open. So long as this condition obtains, gas is supplied neither to the pilot burner nor to the main burner.

To place the system in operation, asuming the switches of the thermostat 26 and thermal cut-off 25 to be closed, the main electric switch 27 is closed to supply current to both the magnet coil 17 and the primary circuit 22 of the ignition transformer 21. Thus energized, magnet coil 17 draws armature 16 upwardly with the result that valve plate 7' is raised to open valve 7, 7'. Since, however, valve 6, 6' is still closed, gas flow has still not been initiated. However, ignition coil 24 is glowing and ready to ignite the pilot burner when gas is supplied thereto. If, now, the push-button 18 is pressed inwardly, armature 16 is forced downwardly, valve 7, 7' is permitted to close under the pressure of compression spring 14, and gas inlet valve 6, 6' is opened, all as illustrated in FIG. 2. In this position of the valve element, gas is permitted to flow to the pilot burner and the pilot flame is established to heat thermocouple 31 and thus energize electromagnet 12. Depression of the push-button and consequent opening of valve 6, 6', as described, also moves armature 11 into contact with the electromagnet 12 and, since the electromagnet is energized, the armature is held in this position to maintain valve 6, 6' in open position against the biasing of spring 9 even after release of push-button 18.

Concurrently with the release of push-button 18, armature 16 returns to its upper position since magnet coil 17 is still energized, and gas is permitted to flow to the main burner to be ignited by the pilot flame. If heat from the pilot burner had not already opened the thermal cut-off switch 25 to open the primary circuit of the transformer to stop the flow of current to ignition coil 24, this will result very shortly after the main burner is ignited.

The system is now in operation. If the thermostat 26 interrupts the circuit 20 to magnet coil 17, the regulator valve 7, 7' closes responsive to the force of spring 14 and the main burner flame is thus extinguished. When the thermostat again calls for heat, the circuit 20 is again closed to energize the magnet 17 and thus again open valve 7, 7'.

If for any reason whatever the flame of the pilot burner is extinguished, current from thermocouple 31 fails and safety control valve 6, 6' closes responsive to the force of compression spring 9 and the gas supply is shut off entirely. When this has happened, the system is placed back into operation only after the cause of the interruption has been remedied.

While the foregoing is a complete and detailed description of the invention embodying preferred structure, its scope is not to be limited to this particular construction used by way of illustration, but only by the scope of the appended claims. It will be understood that several alternatives may readily be employed without departing from the inventive concept. For example, the safety control valve 6, 6' may be controlled by the intermediation of bi-metallic or pneumatic devices between the pilot flame and the valve control apparatus, instead of by the thermo-electric device illustrated. Also, if desired, regulator valve 7, 7' may be arranged to operate between full flame and small flame positions instead of full on and off in order to avoid the noise caused by re-ignition of the main burner.

Invention is claimed as follows:

1. In a gas burner safety control valve system, a valve case having a gas inlet and a gas outlet adapted to be connected with a main burner, a pair of spaced partition walls arranged transversely within said case between said inlet and said outlet, said walls having aligned passageways therein and defining a pilot gas supply chamber having an outlet opening adapted to be connected with a pilot burner, a spring-biased normally closed safety control valve arranged at the passageway nearest said gas inlet to control the flow of gas therethrough, a second spring-biased normally closed valve arranged coaxially with said safety control valve at the pasageway nearest said gas outlet adapted to control the flow of gas therethrough to a main gas burner, control means responsive to heat from a pilot burner to hold said safety control valve open, a valve stem coaxially and slidably extending through said second valve and having engaging means affixed to the lower end thereof, extending laterally therefrom and adapted to engage the lower surface of said second valve, electromagnetic means for moving said valve stem upwardly so that the engaging means engages and opens said second valve, and manually operable means for forcing said valve stem downwardly to permit closing of said second valve and so that the engaging means engages and opens said safety control valve, the arrangement being such that when said control means and said electromagnetic means are energized, depression of said manually operable means moves said engaging means to permit closing of said second valve then engages and opens said safety control valve and subsequent release of said manually operable means permits said engaging means to engage said second valve to re-open while said safety control valve is held open by said control means.

2. Structure in accordance with claim 1 wherein said control means comprises thermoelectromagnetic means including an electromagnet arranged in the valve case and an armature rigidly affixed to the movable element of the safety control valve.

3. Structure in accordance with claim 1 wherein said control means comprises thermoelectromagnetic means including an electromagnet arranged in the valve case, an armature rigidly affixed to the movable element of the safety control valve, and a thermocouple adapted to be exposed to heat from a pilot burner.

4. Structure in accordance with claim 1 wherein said electromagnetic means for moving said valve stem comprises a magnet coil arranged within the valve case and an armature affixed to the top end of said valve stem and disposed within said coil for axial movement responsive to energization of said coil.

5. Structure in accordance with claim 4 and including thermostatic regulating control for the second valve to regulate the flow of gas to a main burner, said control comprising a thermostatic switch connected in series with the magnet coil whereby the opening of said switch releases the armature on the valve stem and permits said second valve to close.

6. A valve system for a gas burner comprising a valve case containing from bottom to top in coaxial alignment therein: an electromagnet, an armature cooperating with said electromagnet, a gas inlet valve stem rigidly attached to said armature and extending upwardly therefrom, a gas inlet valve plate rigidly affixed to the top end of said valve stem and a compression spring biasing said valve plate upwardly, a transverse wall having a passageway therethrough and a valve seat surrounding said passageway, said case having a gas inlet opening thereinto below said wall and a pilot burner outlet above said wall, a second transverse wall with a passageway therethrough and a valve seat surrounding the same and a second valve plate arranged above said seat to cooperate therewith, a second valve stem extending slidingly through said second valve plate and having a second armature affixed to the top end thereof and a button larger in diameter than said stem and affixed to the bottom end thereof, a spring biasing said second valve plate downwardly, a magnet coil surrounding said second armature to control the vertical position thereof, a plunger extending through said case and having a push button on the external end thereof, and a spring biasing said plunger upwardly to normally retracted position, said plunger and valve stem being so dimensioned and arranged that depression of said plunger moves said second valve plate downwardly into engagement with the valve seat and moves said gas inlet valve plate downwardly away from its seat.

7. Structure in accordance with claim 1, wherein the inner end of said manually operable means in its normally retracted position is spaced apart from the upper end of the valve stem extending through said second valve.

References Cited in the file of this patent

UNITED STATES PATENTS

| | | |
|---|---|---|
| 2,286,610 | Focke et al. | June 16, 1942 |
| 2,290,048 | Hildebrecht | July 14, 1942 |
| 2,873,069 | Matthews | Feb. 10, 1959 |
| 2,903,053 | Kile | Sept. 8, 1959 |
| 2,959,650 | Hajny | Nov. 8, 1960 |
| 2,962,093 | Matthews | Nov. 29, 1960 |
| 3,021,857 | Davidson | Feb. 20, 1962 |